Figure 1:
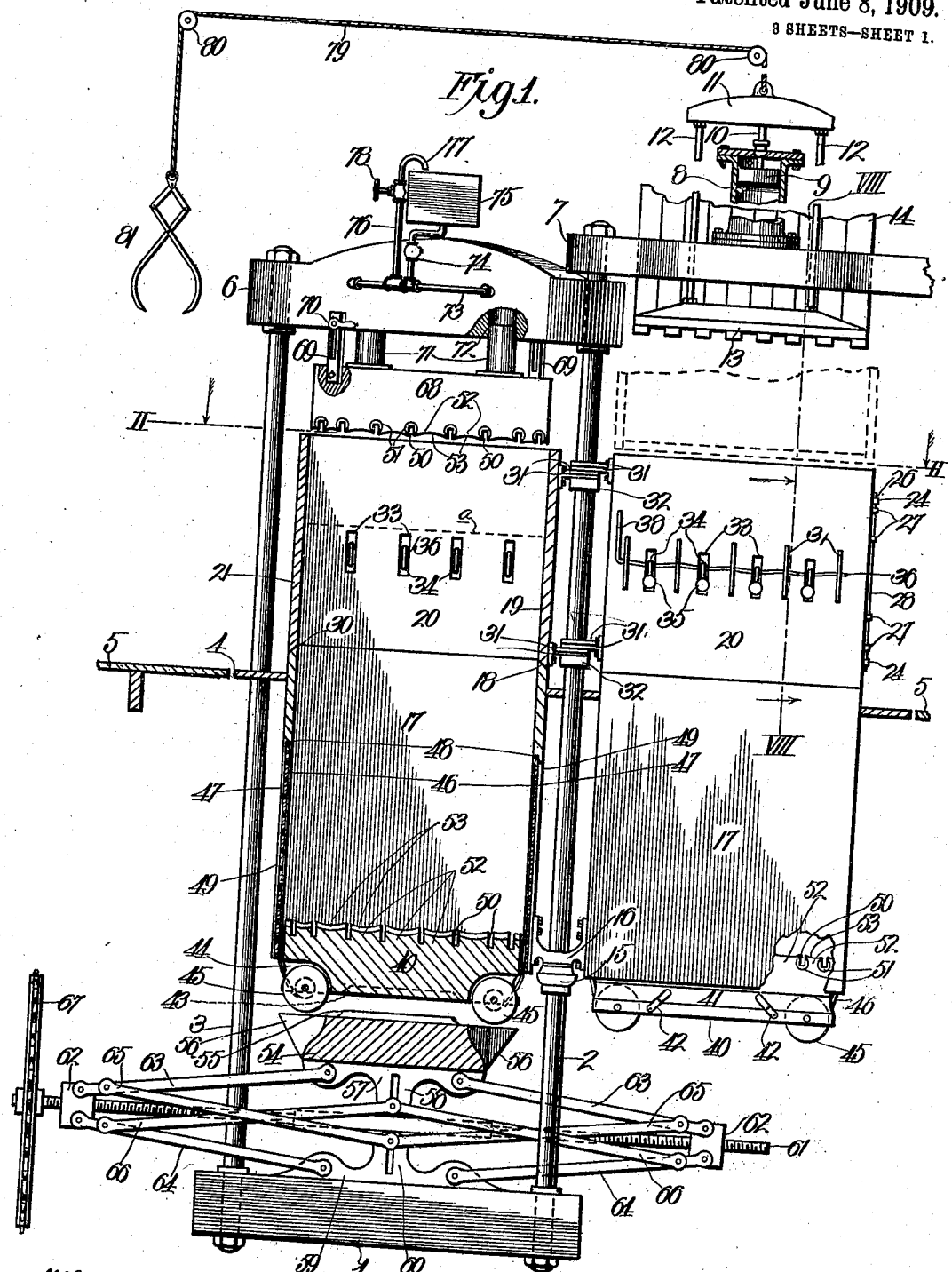

R. D. CROW.
COMBINED BALING AND COMPRESS MACHINE.
APPLICATION FILED MAY 9, 1908.

924,223.

Patented June 8, 1909.
3 SHEETS—SHEET 1.

Witnesses
E. E. Seidelman
H. C. Rodgers

Inventor
Robert Douglas Crow
By George H. Thorpe
Atty.

R. D. CROW.
COMBINED BALING AND COMPRESS MACHINE.
APPLICATION FILED MAY 9, 1908.
924,223.
Patented June 8, 1909.
3 SHEETS—SHEET 2.
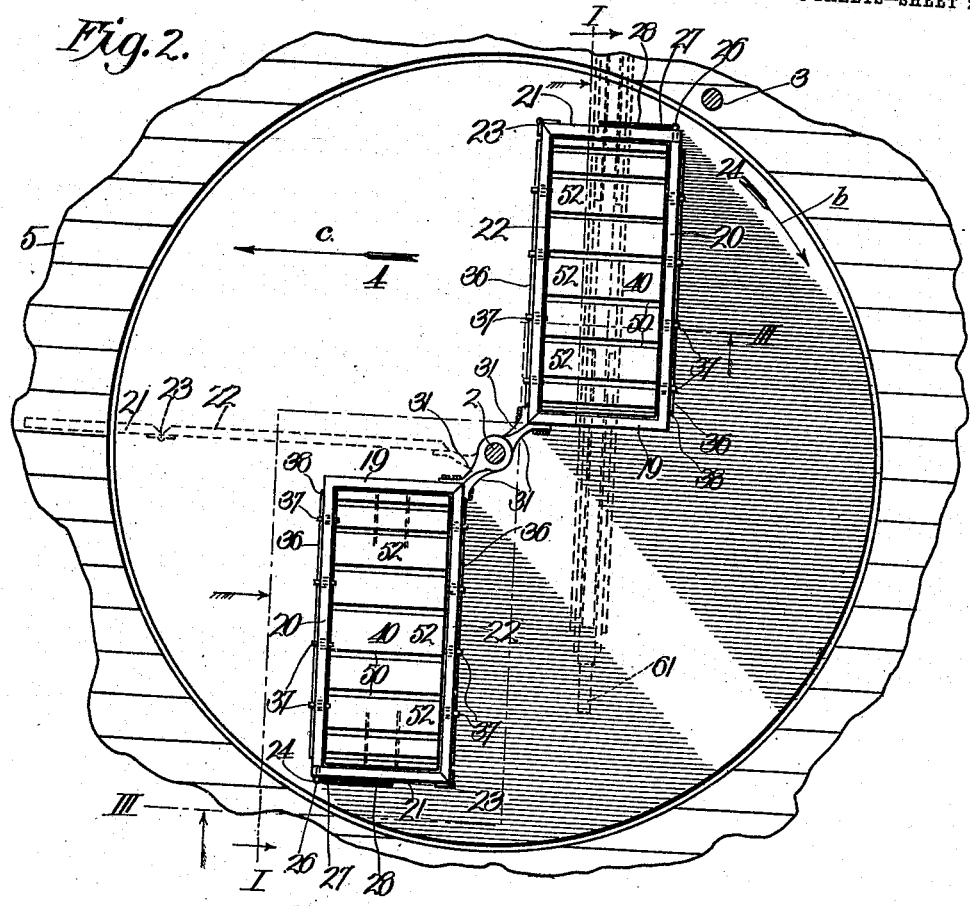
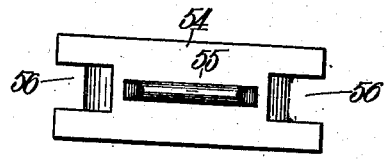
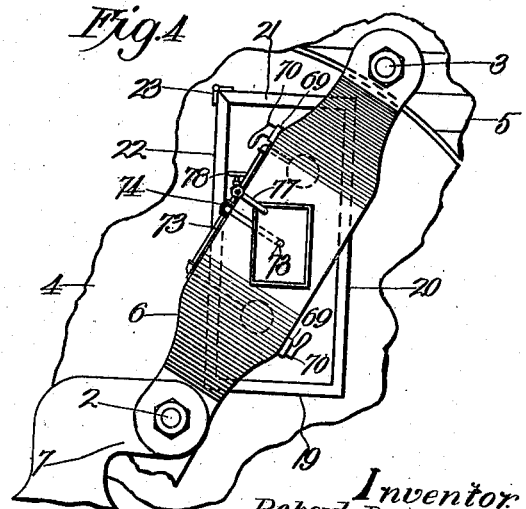
Witnesses.
E. E. Seidelman.
H. C. Rodgers
Inventor
Robert Douglas Crow
By George W. Thorpe
atty.

R. D. CROW.
COMBINED BALING AND COMPRESS MACHINE.
APPLICATION FILED MAY 9, 1908.
924,223.
Patented June 8, 1909.
3 SHEETS—SHEET 3.
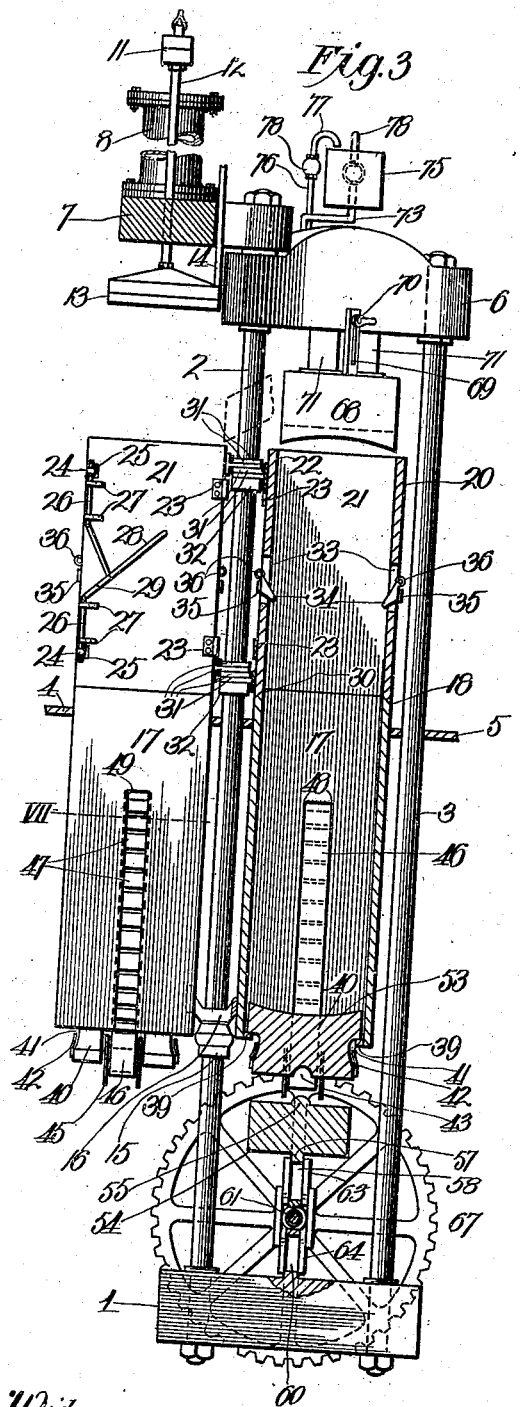
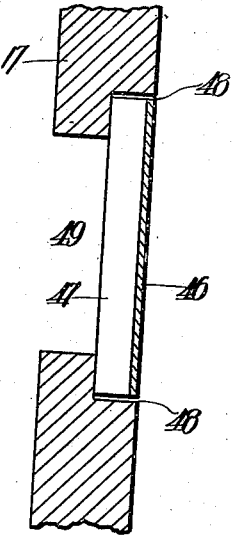
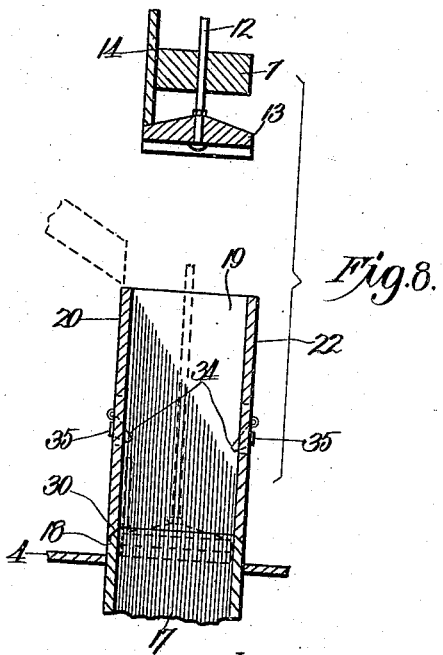
Witnesses.
E. E. Seidelman.
H. C. Rodgers.
Inventor.
Robert Douglas Crow.
By George F. Thorpe
Atty.

UNITED STATES PATENT OFFICE.

ROBERT D. CROW, OF HENDERSON, TEXAS.

COMBINED BALING AND COMPRESS MACHINE.

No. 924,223.

Specification of Letters Patent.

Patented June 8, 1909.

Application filed May 9, 1908. Serial No. 431,760.

*To all whom it may concern:*

Be it known that I, ROBERT D. CROW, a citizen of the United States, residing at Henderson, in the county of Rusk and State of Texas, have invented certain new and useful Improvements in Combined Baling and Compress Machines, of which the following is a specification.

My invention relates to baling presses and more especially to presses of that type wherein cotton is both baled and compressed at the ginnery, and my primary object is to produce an efficient and reliable press of the type outlined, which will bale cotton to a density acceptable to the land and water transportation companies and the spinners, in sufficient quantity to justify the installation of the press by any ginnery handling as low as five hundred bales per annum.

With this general object in view, the invention consists in certain novel and peculiar features of construction and organization as hereinafter described and claimed; and in order that it may be fully understood reference is to be had to the accompanying drawings, in which:—

Figure 1, is a vertical section of a baling press embodying the invention, taken on the line I—I of Fig. 2. Fig. 2, is a horizontal section taken on the line II—II of Fig. 1. Fig. 3, is a vertical section taken on the line III—III of Fig. 2. Fig. 4, is a top plan of the compress side of the press. Fig. 5, is a top plan of the power-head of the compress-mechanism. Fig. 6, is a vertical cross-section of one of the plungers which act as abutments in the baling operation and as plungers in the compress action. Fig. 7, is an enlarged horizontal section on line VII of Fig. 3, of one of the elements which alternately act as baling and compress cases. Fig. 8, is a vertical transverse section on line VIII—VIII Fig. 1 of one of the cases and the tramper to force the loose cotton therein, to form a bale.

In the said drawings where like reference characters refer to corresponding parts, 1 indicates a foundation or base of any suitable character and secured to the same and projecting vertically upward therefrom is a stationary shaft 2 and a standard 3, the former forming the journal for turn-table 4 occupying an opening in the floor or platform 5.

6 indicates a bar secured rigidly to and connecting the upper ends of shaft 2 and standard 3, and 7 is a bar secured upon the upper end of the shaft above cross-bar 6 and adapted to be permanently anchored at its other end in any suitable manner. Said bar 7 forms a support for the steam cylinder 8 having an ordinary piston 9 provided with a stem 10 projecting up through the upper end or head of the cylinder and secured rigidly to a cross-head 11 provided with depending rods 12, guided by preference, by bar 7, to reciprocate vertically and equipped at their lower ends with a tramper 13, from one side margin of which a cut-off 14 projects upwardly, for a purpose which hereinafter appears. The object of projecting the piston stem upwardly through the upper end or head of the steam cylinder instead of arranging it with said stem extending downward through the lower end of said cylinder is twofold, first to provide a convenient means of raising and lowering the tongs hereinafter referred to, and second, to eliminate any possibility of steam entering the underlying baling case, which would occur if the stem projected through the lower end of the cylinder, as will be readily understood.

Below the turn-table shaft 2 is equipped with an enlargement of collar 15 as a support for a bracket 16, journaled on said shaft and secured at its opposite ends to a pair of rectangular baling cases 17, said cases projecting up through the turn-table so that the latter may coöperate with bearing bracket 16 in holding the cases in rigid relation to each other, it being noticed in this connection and by reference to Figs. 1 to 3 inclusive, that one of said cases is vertically below the tramper and the other below bar 6 and that they are disposed with their inner or adjacent side-walls and their inner or adjacent end-walls in parallel vertical planes but at opposite sides of shaft 2, and that the vertical planes of the side-walls of the cases intersect the vertical plane of shaft 2 and standard 3, as shown most clearly by Figs. 2 and 4.

The upper ends of cases 17 are tapered as shown at 18 for a purpose which hereinafter appears, and superposed with respect to said cases are case-extensions, each consisting of an inner end-wall 19 and outer side-wall 20 rigidly secured together and an outer end-wall 21 and inner side-wall 22 hinged together at 23, the outer end-wall having notches 25 in its free edge to accommodate the outwardly projecting eye-bolts 24 projecting from the outer ends of side-walls 20. 26 are slide-bolts mounted in keepers 27 secured to end-walls 21, and suitably connected at their inner ends to a lever 28 pivoted as at 29 to wall 21, said lever, when end-wall 21 is closed against side-wall 20, being operated to cause bolts 26 to engage eye-bolts 24 and thus lock the walls 19, 20, 21 and 22 in rigid relation, the withdrawal of said bolts 26 from the eye-bolts 24 permitting end-wall 21 to swing outward in line with side-wall 22, it being noticed in this connection by reference to Figs. 1, 3 and 8, that the lower ends of the walls of each case-extension are beveled outwardly and downwardly as at 30, to cause said walls when locked rigidly together as described, to overlap the tapered upper end 18 of its respective case 17, this overlap relation guarding against any independent movement between a case and its extension and insuring perfect alinement thereof.

Two sets of brackets are journaled on shaft 2, each set consisting of two brackets 31 secured respectively to walls 19 and 22, the brackets secured to wall 19 serving as hinges for said wall and wall 20 rigid therewith, and the brackets secured to wall 22, as hinges for said wall and wall 21, the hinges 23 hereinbefore described, being provided only to enable the operator to swing wall 21 in alinement with wall 22 for a purpose which hereinafter appears. The hinge-brackets 31 are supported upon enlargements or collars 32 of shaft 2, the brackets of one case-extension resting upon said collar and the brackets of the other case-extension upon the first-named brackets, as shown clearly in Fig. 1.

The side-walls of each case-extension are provided with series of slots 33 occupied by retainers 34 projecting into the interior of the extensions and provided with laterally projecting wings 35 to engage the outer faces of the contiguous side-walls and thus limit the distance which the retainers may swing into the extension. The retainers are secured to cranks of a rock-shaft 36 journaled in brackets 37 secured to the outer faces of the side-walls of the extensions, and one end of each crank-shaft is equipped with a crank-handle 38 by which the retainers may be withdrawn from slots 33 to an inoperative position.

Each case 17 is equipped with cleats or stops 39 projecting inwardly from the lower ends of its side-walls, and occupying and adapted to reciprocate within said case and its extension as hereinafter explained, is a plunger 40 which, when in its normal position, rests upon said cleats or stops, as shown clearly in Fig. 3. Each plunger is reduced in width so that it may depend from the case through the space between the cleats or stops and at the upper end of the depending portion it is formed with grooves 41, and projecting into said grooves for a purpose hereinafter explained, are pivoted clamps or turn-buttons 42. Each plunger 40 is also provided in its under side with a groove 43 extending parallel to its sides and with recesses 44, in which are journaled flanged-spools or drums 45 of the spring-roller type and therefore not detailed, and attached at their lower ends to said spools or drums are curtains 46 equipped externally with transverse stiffening strips and, with the latter occupying rabbets 48 in the inner faces of the end walls of the case, the upper ends of the curtains being pivoted or secured in any other suitable manner to said walls at the upper ends of said rabbets in order that the curtains may form closures for the vertical slots 49 in the end walls of the case above plungers 40, except, of course, when said plungers are disposed above said slots, as hereinafter appears. Each plunger 40 is also provided with a series of transverse grooves 50, terminating at their ends in flared mouths or enlargements 51, said grooves dividing the upper side of the plunger into a plurality of upwardly-disposed projections 52 having their faces concaved both longitudinally and latitudinally as at 53, for the purpose which hereinafter appears.

For the purpose of imparting upward movement to the plunger which occupies the case vertically below cross bar 6, I provide the following mechanism: 54 is a power-head provided with an upwardly projecting rib 55 to enter groove 43 of the overlying plunger 40 this arrangement centering and acting to guard against movement in any but a vertical direction of the power-head, during the power and withdrawal movements of the same as hereinafter referred to. The power-head is also provided with openings 56 to receive and accommodate the spools or drums 45 of said plunger. Said head is also provided centrally with a depending rib 57, having a central vertically-slotted lug 58. 59 is a similar rib rigid with and projecting upward from base or foundation 1 and provided with a similar vertically slotted lug 60. 61 indicates a horizontal worm-shaft having right and left-hand threads at its opposite ends, and engaging the threaded portions of said shaft are collars 62 pivotally connected by toggle-levers 63 and 64, to ribs 57 and 59 respectively, the toggle-levers 63 being pivotally engaged by braces 65 having pin-and-slot engagements with slotted lug 60. The toggle-levers 64 are pivotally engaged by braces 66 having pin-and-slot engagements with slotted lug 58.

To impart rotary movement in one direction or the other to the worm-shaft and thus effect the expansion or contraction of the toggle mechanism thereof and incidentally upward or downward movement of the power-head, a sprocket-wheel 67 is secured upon the worm-shaft and is adapted to be driven by a chain, not shown, which will automatically adapt itself in a manner well known in the art, to the upward and downward movement of the sprocket-wheel and the worm-shaft, it being understood in this connection, that the slots 49 in the end walls of case 17 are necessary in order to permit shaft 61 to travel upward a sufficient distance to impose the full power of the toggle-levers on the bales to compress the same to the desired density.

68 indicates an upper platen, arranged vertically over the extension of the case 17 which at the time is overlying the power-mechanism, having its lower face corresponding in all respects to the upper face of the underlying plunger 40, said platen 68 being suspended from cross-bar 6 by two or more vertically-slotted hangers 69, which can be adjusted by clamp-nuts 70 to limit and determine the downward or gravitative movement of the platen 68.

71 indicates a pair of pistons secured to and projecting vertically upward from platen 68 into chambers 72 with a liquid-tight relation, and 73 is a pipeway provided with a check valve 74 connected to an overhead tank 75, the check valve being of the usual type and adapted to permit liquid from the tank to flow downward into said chambers.

76 is a pipe connected to pipe 73 below the check valve and terminating in a gooseneck or spout 77 to discharge into the tank, and equipped with a controlling valve 78.

When the chambers 72 are charged with liquid and valve 78 is closed, the platen 68 cannot move upward under the pressure transmitted by a bale from the underlying plunger and power mechanism.

If it is desired to increase the thickness of the bale without a variation in density, the platen can be adjusted upward to the desired point and so secured by the proper manipulation of the clamping nuts, a similar adjustment being made if it is desired to increase the thickness of the bale and diminish its density, it being understood that in either event the valve 78 will be opened if the power mechanism becomes stalled before the toggle-levers 63 and 64 attain the position hereinafter explained as necessary if they are to exert their maximum pressure on the bale.

Preliminary to the operation of baling and compressing cotton or other material, the usual covering-fabrics, not shown, for the bales, are placed on the plungers 40, each fabric being draped down over the sides and ends of its plunger, and to retain it thus draped it is pressed into the grooves 41 and secured therein by the pivoted clamps or turn-buttons 42. A similar covering, not shown, for the top of the bale when compressed is also arranged at the under side of platen 68 and is folded up around the sides and ends thereof and upon its upper side and tacked or otherwise secured on said upper side, by preference.

In practice, the cotton or other material is fed through the usual chute indicated by dotted lines in Figs. 1 and 3, because forming no part of this invention, into the upper end of the extension of the case vertically below the tramper. The latter is then caused to descend and force the cotton downward in such case against the plunger 40 thereof, the wall 14 of the tramper cutting off the supply of cotton to such case as the tramper enters the extension thereof, the retainers yielding to permit the cotton to be forced downward and preventing it from bulging upward materially as the tramper withdraws, the action of the tramper being controlled by any suitable means, not shown, controlling the admission of steam to and from the cylinder.

When the case has been charged, the turn-table is caused to make a half-revolution by any suitable means, not shown, because common in the art, in order to dispose the charged case vertically below the platen 68 and above the power head, and the empty case vertically below the tramper. As soon as the cases are thus disposed, the empty one receives a new charge of cotton and the tramper is caused to repeat the operations described. At the same time the worm-shaft 61 is caused to revolve to start the expansion of the toggle mechanism, the initial result of this action being to cause the power-head to engage the overlying plunger 40, the rib 55 of the power-head engaging the groove 43 of the power-head plunger and the notches 56 of the power-head receiving the spools or drums 45, so as to not interfere with the operation of said spools or drums as the power head forces said plunger and the superposed bale upward in the case, the stiffened curtains 46 preventing the cotton from bulging out through slots 49 and automatically winding upon the spools or drums until the latter attain the plane of the upper ends of said slots. The continued upward movement of the plunger then overcomes the resistance of the spring-actuated spools or drums and again starts the unwinding therefrom of said curtains, it being understood that before this operation takes place the handles 38 of the retainer shafts of the case in which the compression action is to occur, are operated to withdraw the connected retainers to inoperative position. The plunger 40 raises the bale and compresses it against the platen 68, to substantially the thickness indicated by the distance between the lower face of said platen and the dotted line a. In the event that the resistance is such that the power mechanism is stalled or stopped before the maximum power of the power mechanism is exerted on the bale, viz. before toggle-levers 63 and 64 attain an almost vertical position, which will occur when the baled cotton exceeds a predetermined weight, say five hundred pounds, and when it therefore is not compressed as tightly as it should be—approximately twenty five pounds per cubic foot; the operator opens the valve 78 to permit platen 68 to yield and move upward under the pressure of the bale, it being understood that initially the chambers 72 are fully charged with liquid from tank 75 to offer an unyielding resistance to upward movement of the platen. The upward movement of the platen causes the water to pass from chamber 72 up through pipe 75 and back into tank 75, such movement of the platen being checked by the reclosure of the valve 78, just before the toggle-levers 63 and 64 attain the substantially vertical position referred to so as to impart their maximum pressure through head 54 and plunger 40 on the bale. It will thus be seen that through the use of the coöperating adjustable platen 68, each bale irrespective of the amount of cotton therein, is subjected to the maximum pressure of the power mechanism and therefore weighs substantially twenty-five pounds per cubic foot or any other predetermined number of pounds per cubic foot within the capacity of the power mechanism. As soon as the bale is thus compressed, the operation of the power mechanism is stopped and the person in control manipulates the proper lever 28 to withdraw bolts 26 from the eye-bolts 24, to permit the rigidly connected walls 19 and 20 to be swung open in the direction indicated by the arrow b, Fig. 2, and the hingedly-connected walls 21 and 22 to be swung open in the opposite direction and thus expose the sides and ends of the compressed bale to enable the attendant to release the underlying covering from clamp 42 and fold it up around the sides and ends of the bale, and drape overlying covering down around the sides and ends of the bale and sew the folded end portions of the covering together in the usual manner. The exposure of the bale also permits the attendant to slip the opposite ends of bale ties (not shown) through the grooves 50 of the plunger and platen, the flared mouths of said grooves facilitating the insertion of said ties in the grooves, as will be readily understood, and to draw the upper ends down and the lower ends up at opposite sides of the bale until the latter is tightly bound by the ties, the ends of the latter being then secured together in the usual or any preferred manner. In this connection will be observed the advantage of the longitudinally and latitudinally concaved faces of the plunger and platen, as by such formation the bale is permitted to bulge outwardly between the grooves in order to avoid compressing the cotton to a density in excess of that which it ultimately exhibits, as is the case where the bale-engaging surfaces are flat, as in such cases power is utilized to compress portions of the bale which must and do reëxpand as soon as the bale is removed from the compress. By my construction I apply the maximum compression at the edges of the grooves and leave the bale free to expand between them, thus rendering unnecessary excess power to compress the parts of the bale which ultimately must and do reëxpand.

By hinging the wall 21 to wall 22 to permit them to be disposed in alinement, the attendant is enabled to more easily move the compressed and finished bale completely out of the machine and off the turn-table in the direction indicated by the arrow, which could not be done as conveniently if the wall 21 was rigidly connected to wall 22, as in the latter event the wall 21 might be injured should the bale be permitted to fall against it.

After the bale is removed new coverings of the character mentioned are secured to the plunger and the platen as explained and the walls are resecured in their original positions with respect to each other and the underlying body of the case. The shaft 61 is then rotated to effect the contraction of the toggle-mechanism, the plunger 40 following the power-head downward by gravity until it attains its original position as shown in Fig. 1, and in this connection will be seen the advantage of draping the covering of the plunger down around its sides and so securing it by the clamps 42, as otherwise the flap portions of the covering would pile upon the plunger and have to be prodded down around its sides. The retainers of the case from which the compressed bale was removed are then restored to their original positions and the turn-table caused to describe a half-revolution to reverse the positions of the cases with respect to the tramper and the platen 68, after which the operations described are repeated.

By means of the connection between the tongs and the cross-head, the movement of the latter can be utilized for conveniently and quickly removing the completed bale from position or in otherwise handling the same as will readily be understood.

I am aware that baling presses have been provided in which toggle-lever mechanism has been employed for actuating a plunger but I am not aware of any machine having both baling and compressing functions in which a toggle-lever mechanism has been employed for compressing the bales, and to accomplish this result in a press employing two baling cases to be rotated and thus alternately disposed over such mechanism, it is necessary that such cases be offset with respect to each other, that is be disposed in parallel planes in order that the one in which the baling action is taking place shall be out of the path of vertical movement of the toggle-lever mechanism.

From the above description it will be apparent that I have produced a baling press. possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters-Patent, is:—

1. In a machine of the character described, a toggle-lever actuated power-head, a pair of baling-cases, plungers in said cases, means whereby said cases shall be simultaneously moved and alternately alined with and above said power-head, and a vertically-adjustable platen vertically above the power-head and the plunger of the case alined with the power-head.

2. In a machine of the character described, a suitable platform having an opening, a turn-table occupying said opening, a vertical shaft extending axially through the turn-table, a pair of oblong-rectangular cases extending through the turn-table with their adjacent sides at opposite sides of the shaft and their adjacent ends also at opposite sides of the shaft, oblong-rectangular extensions for and superposed upon the cases, and each consisting of two sections, one section comprising an end-wall and a side-wall bearing a rigid relation to each other and a hinged relation to the shaft, and the other section a side-wall and an end-wall bearing a hinged relation to each other and to the shaft, and means to secure the said sections of the extension together.

3. In a machine of the character described, a toggle-lever-actuated power-head, a pair of baling cases in a horizontal plane above the normal horizontal plane of the power-head and provided in the vertical plane of the toggle-lever mechanism with vertical slots opening downward through the lower ends of the cases, reciprocatory plungers occupying said cases, means to normally support said plungers at the lower ends of the cases and above the plane of the power-head, spools or drums carried by the plungers, flexible curtains attached at their opposite ends to said spools or drums and to the cases at the upper ends of said slots and normally bridging the latter, and means whereby said cases shall be alternately alined with said power-head.

4. In a machine of the character described, a toggle-lever-actuated power-head, and a tramper adapted to operate in parallel planes and in opposite directions simultaneously, a pair of cases to respectively receive said power-head and tramper, and rotatable means whereby the relative positions of said parts shall be changed so that the case originally adapted to receive said tramper shall be disposed to receive power-head and the other case to receive the tramper.

5. In a machine of the character described, a toggle lever-actuated power-head, an adjustable platen in the line of movement of said power head, a pair of cases, and means whereby said cases shall be alternately disposed in line with said power-head and platen and adapted to receive the former.

6. In a machine of the character described, a toggle-lever-actuated power-head, a tramper to reciprocate in a path parallel with but not in the line of movement of the power-head, an adjustable platen in the line of movement of the power-head, a pair of cases to simultaneously receive the power-head and tramper respectively, and means whereby the positions of said cases shall be reversed to dispose the one originally in alinement with the power-head and platen in alinement with and adapted to receive the tramper, and the other in alinement with the power-head and platen and adapted to receive the former.

7. In a machine of the character described, a suitable platform having an opening, a turn-table occupying said opening, a vertical shaft extending axially through the turn-table, a pair of baling-cases journaled on said shaft and projecting non-rotatably up through the turn-table at diametrically opposite sides of the shaft, a baling case extension superposed upon each of said baling-cases, each of said baling-case extensions consisting of sections independently hinged on said shaft, means for locking said sections together at their free edges and upon and in line with their respective underlying cases, reciprocatory plungers normally occupying the lower ends of the cases, a power-head underlying one of the cases and its plunger, means to cause said power-head to move upward into said case and force the plunger upwardly therein ahead of it, and afterward return to its original position and permit the plunger to do likewise, a tramper overlying the other case and its extension, and means to cause the tramper to move downward into the said extension and return to its original position above the same.

8. In a machine of the character described, a suitable platform having an opening, a turn-table occupying said opening, a vertical shaft extending axially through the turn-table, a pair of baling cases journaled on said shaft and projecting non-rotatably up through the turn-table at diametrically opposite sides of the shaft, a baling case extension superposed with respect to each case and each consisting of sections independently hinged on said shaft, means for locking said sections together at their free ends and upon and in line with their respective underlying cases, reciprocatory plungers normally occupying the lower ends of the cases, a power-head underlying one of the cases and its plunger, means to cause said power-head to move upward into said case and force the plunger upwardly therein ahead of it and afterward return to its original position and permit the plunger to do likewise, a tramper overlying the other case and its extension, means to cause the tramper to move downward into the said extension and return to its original position above the same, and a vertically adjustable platen to receive the pressure of a bale compressed through the agency of the upwardly moving power-head.

9. In a machine of the character described, a suitable platform having an opening, a turn-table occupying said opening, a vertical shaft extending axially through the turn-table, a pair of baling cases journaled on said shaft and projecting non-rotatably up through the turn-table at diametrically oposite sides of the shaft, a baling case extension superposed with respect to each case and each consisting of sections independently hinged on said shaft, means for locking said sections together at their free ends and upon and in line with their respective underlying cases, reciprocatory plungers normally occupying the lower ends of the cases, a power-head underlying one of the cases and its plunger, means to cause said power head to move upward into said case and force the plunger upwardly therein ahead of it and afterward return it to its original position and permit the plunger to do likewise, a tramper overlying the other case and its extension, means to cause the tramper to move downward into said extension and return to its original position above the same, a vertically adjustable platen to receive the pressure of a bale compressed through the agency of the upwardly moving power-head and overlying platen, and means to rotate the turn-table a half revolution to reverse the positions of the cases and their extensions and plungers with respect to the power-head and the tramper.

10. In a machine of the character described, a baling case having inwardly projecting cleats at its lower end, a reciprocatory plunger in said case normally resting on said cleats and provided with grooves in its side, and clamps secured to the plunger and adapted to clamp in said grooves the depending portions of a flexible covering adapted to be draped over and carried by the plunger.

11. In a machine of the character described, a baling case having vertical slots in its lower end and opposite walls, a plunger normally occupying the lower end of the case at the lower end of said slots, and provided with recesses in the vertical plane of said slots, spools or drums occupying said recesses, and flexible curtains normally bridging the slots of the case and attached at their upper ends to the latter at the upper ends of the slots and at their lower ends to said spools or drums.

12. In a machine of the character described, a baling case having slots in its lower end and opposite walls, a plunger normally occupying the lower end of the case and provided with recesses in the plane of said slots and with a centering groove in its under side, curtains normally bridging and closing said slots and secured at their upper ends to the case at the upper ends of the slots and at their lower ends to said spools or drums, a power-head underlying the plunger and provided with a centering rib to enter said groove and with recesses to receive said spools or drums, a horizontal shaft underlying the power-head in the vertical plane of said slots and provided with right and left-hand threads at opposite sides of the center of the case, collars engaging the shaft and adapted to travel toward and from each other simultaneously accordingly as the shaft is turned in one direction or the other, and toggle-lever mechanism pivotally connecting said collars with said power-head.

13. In a machine of the character described, a suitable platform having a circular opening, a stationary vertical shaft extending axially through said opening, a vertical post disposed outward of said opening, a bar connecting the upper ends of the shaft and post above the platform, a vertically-adjustable platen depending from said bar, a turn-table arranged in said opening and around the shaft and provided with a pair of rectangular openings at opposite sides of the shaft, a collar secured to the shaft below the platform, a pair of rectangular baling-cases fitting snugly in said openings of the platform, a bracket connecting said baling-cases and journaled on the shaft and resting upon the said collar, plungers occupying said baling-cases and adapted for vertical movement therein, baling-case extensions for and superposed with respect to the baling-cases and each consisting of two parts having a hinged relation to the shaft, a power-head vertically below the platen, a tramper diametrically opposite the platen, means to cause the power-head to move upward into the baling-case containing the plunger vertically below the platen and return to its original position, and means to cause the tramper to move downward into the extension of the other baling-case and return to its original position.

In testimony whereof I affix my signature, in the presence of two witnesses.

ROBERT D. CROW.

Witnesses:
H. C. RODGERS,
G. Y. THORPE.